United States Patent [19]

Grasso et al.

[11] Patent Number: 5,113,459

[45] Date of Patent: May 12, 1992

[54] OPTICAL FIBER TELECOMMUNICATION LINE WITH SEPARATE, OPTICALLY TRANSMITTED SERVICE CHANNELS

[75] Inventors: Giorgio Grasso, Monza; Mario Tamburello, Vimercate, both of Italy

[73] Assignee: Pirelli Cavi S.p.A., Milan, Italy

[21] Appl. No.: 647,141

[22] Filed: Jan. 29, 1991

Related U.S. Application Data

[63] Continuation-in-part of Ser. No. 555,941, Jul. 20, 1990, Pat. No. 5,054,876, and a continuation-in-part of Ser. No. 605,558, Oct. 29, 1990.

[30] Foreign Application Priority Data

Jan. 30, 1990 [IT]  Italy ........................ 19186 A/90

[51] Int. Cl.$^5$ ............................................. G02B 6/28
[52] U.S. Cl. ............................................. 385/24; 385/27; 359/173
[58] Field of Search .................. 350/96.15, 96.16, 96.14; 385/24, 25, 26, 27, 28-32

[56] References Cited

U.S. PATENT DOCUMENTS

| | | | |
|---|---|---|---|
| 4,276,656 | 6/1981 | Petryk, Jr. | 350/96.16 X |
| 4,781,427 | 11/1988 | Husbands et al. | 350/96.16 |
| 4,863,231 | 9/1989 | Byron et al. | 350/96.16 |
| 4,878,726 | 11/1989 | Fatehi | 350/96.16 X |
| 4,886,334 | 12/1989 | Aoki | 350/96.15 |
| 4,911,515 | 3/1990 | So et al. | 350/96.16 |
| 4,957,339 | 9/1990 | Fussgänger et al. | 350/96.15 |
| 5,054,896 | 8/1991 | Grasso et al. | 385/24 |

*Primary Examiner*—John D. Lee
*Assistant Examiner*—Phan T. Heartney
*Attorney, Agent, or Firm*—Brooks Haidt Haffner & Delahunty

[57] ABSTRACT

An optical fiber transmission line which includes units for injecting into, and units for extracting, optical service signals from the line's optical fiber. The units include optical service signal emitters and receivers for receiving from the optical line and/or injecting into the optical line service signals in the form of optical signals having a wavelength which is substantially different from the wavelength of the telecommunication signals also transmitted over the optical line, each of the units is associated with an optical coupler which is inserted in the line and which is suitable for coupling it with the line fiber and/or for extracting the optical service signals from the line fiber.

12 Claims, 2 Drawing Sheets

OPTICAL FIBER TELECOMMUNICATION LINE WITH SEPARATE, OPTICALLY TRANSMITTED SERVICE CHANNELS

RELATED APPLICATIONS

This application is a continuation-in-part of application Ser. No. 07/555,941, filed Jul. 20, 1990 now U.S. Pat. No. 5,054,876 and entitled Optical Fiber Telecommunication Line Including Amplifiers Distributed Along The Line For The Transmitted Signals and of application Ser. No. 07/605,558, filed Oct. 29, 1990 and entitled Amplifier Adapter For Optical Lines.

FIELD OF THE INVENTION

The present invention relates to an optical fiber telecommunication line provided with an independent channel for service communications.

BACKGROUND OF THE INVENTION

Communication lines, suitable for allowing the transmission of communications over great distances, usually provide, in addition to the channels used for communication signals provided for subscribers, an independent channel, suitable for allowing the transmission of service communications.

Such service signals can be of different kinds, e.g., for control or command signals for equipment located along the line, such as amplifiers or repeaters, or for communications between maintenance staff, located at a point along the line, and an intermediate or end station of the line itself.

In an optical fiber telecommunication line, provided at regular intervals with repeaters for the amplification of the transmitted signals, one or more of the channels may be used for the service signals, which are accessible, for sending or receiving service signals, at each repeater, where the optical signals are detected and transformed into electrical signals, electronically amplified and once again sent towards the destination station, in an optical form.

In such repeaters, a service signal converted into an electrical form can be easily received and used for the desired purposes, and in a similar manner, a signal may be injected in an electric form into the repeater and then converted into an optical signal together with the other signals subjected to amplification and sent along the line.

However, optical fiber telecommunication lines which have currently proved convenient and which, instead of repeaters, of an electronic type, use optical amplifiers, in a position of amplifying the signal without converting it into an electrical form.

In such lines, it is not possible for signals to be injected into or to be extracted from the fiber along which they are transmitted with the known electronic equipment, because the signals are available only in an optical form, even at the amplifiers.

The problem, therefore, arises of injecting into and extracting the service signals from an optical telecommunications line, possibly provided with optical amplifiers, by operating on the signals themselves in an optical form.

There are known devices called "optical couplers" which are suitable for injecting signals into, or for extracting signals from, an optical fiber, such signals having a wavelength different from that of the other signals which pass unaltered, but, in order for such couplers to operate correctly, with a complete separation between the extracted signals and the unaltered signals and with a reduced attenuation of the signals themselves, they must operate between wavelengths that are substantially different whereas optical communications are accomplished in a fairly narrow range of wavelengths where the transmission characteristics of the fiber are better.

SUMMARY OF THE INVENTION

The main object of the present invention is to provide an optical fiber transmission line where it is possible to inject and extract service optical signals, without having to convert the transmitted communication signals into an electrical form.

In accordance with the present invention, an optical fiber transmission line, comprising at least one transmitting station and one receiving station for telecommunication signals and at least one optical amplifier, comprises means for injecting and means for extracting optical service signals from the line's optical fiber, said means comprising at least one optical device signal transmitting and/or receiving unit which is suitable for receiving from the optical line and/or transmitting to the optical line such service signals. Such service signals can be communication or control signals, electrically supplied by or taken from the unit itself, and converted to optical signals having a wavelength which is substantially different from the wavelength of the telecommunication signals. Said unit is associated with an optical coupler inserted in the line and suitable for coupling within the line fiber and/or for extracting from it the optical service signals. With the optical amplifier, or with each optical amplifier, there is at least one means associated therewith for injecting or for extracting optical service signals.

Preferably, the optical amplifier, or each optical amplifier, is associated with a means for injecting and with a means for extracting service optical signals which diverts the service signals to a path external to the amplifier.

The wavelength of the service signals is substantially equal to or differs only slightly from a wavelength which corresponds to a selected minimum of the attenuation curve for the light in the optical fiber.

Conveniently, such wavelength of the telecommunication signals is in the range from substantially 1500 to substantially 1600 nm, and the wavelength of the service signals ranges from 1200 to 1400 nm, said service signals being transmitted at a rate substantially lower than 300 Kbit/sec.

Preferably, the optical couplers are constituted by dichroic fiber couplers.

In a preferred embodiment, the line optical amplifier or amplifiers are constituted by sections of active fiber, doped with fluorescent substances, and by means for injecting into the sections of active fiber light pumping energy, having a wavelength different from the telecommunications wavelength, which is generated by respective pumping lasers. There are, at least one amplifier, a service optical signal receiving unit and emitting unit and corresponding optical couplers inserted along the line fiber, upstream and downstream from the optical amplifier directed respectively, in the direction in which the service signals are to be sent.

Conveniently, the receiving and emitting units are connected together electrically, optionally with the interposition of electronic amplification means, said units being suitable, respectively, for receiving optical service signals from the line, for transforming them into electrical signals and for amplifying them electronically and for receiving the amplified electrical signals, for converting them into optical signals at the service wavelength and for sending them along the line. The receiving and emitting units of the service signals can comprise means for the control and command of the amplifier's pumping laser or lasers which is driven by the service signals.

In a preferred embodiment of the invention, the means for injecting light pumping energy into the active fiber sections of at least one optical amplifier and the service signals at the amplifier comprise a single, three-wavelength, optical coupler.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENTS

Figure 1:
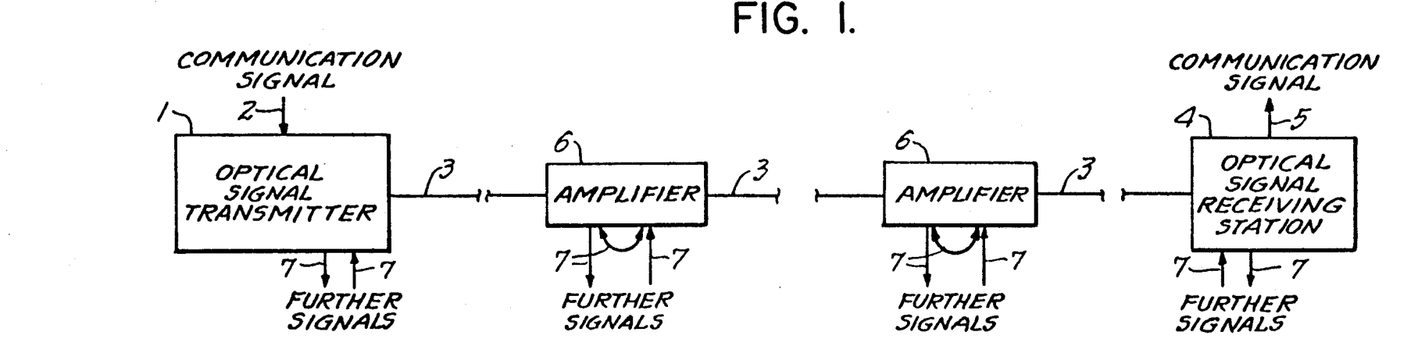
FIG. 1 is a block diagram of an optical fiber telecommunication line, with line amplifiers.

As shown in FIG. 1, a telecommunication line of the optical type comprises, in general, a transmitting station 1 for the emission of optical signals, at the input 2 of which the communication signals to be transmitted are received, such communication signals usually being in the form of electrical signals. The optical signals are injected into a first section of an optical fiber line 3.

At the opposite end of fiber line 3, at a substantial distance from the transmitting station 1, which can be on the order of hundreds of kilometers, there is a receiving station 4 suitable for receiving the optical signals transmitted along the line 3, for converting them into signals of another nature, e.g., electrical signals and for sending such signals over the output line 5 to the receiving equipment (not shown).

The transmitting and receiving stations 1 and 4 are known in themselves and will not be described in further detail.

Along the fiber line 3, due to the attenuation to which the optical signal is inevitably subjected in its path along the fiber, there are line amplifiers 6, suitable for receiving the optical signal attenuated after a certain length of fiber and for retransmitting it, after having restored it to the original level, to a further fiber section and hence, to another amplifier or to the receiving station 4. The amplifiers 6 maintain the optical signals at a level such that at the receiving station 4, they have a level which will allow proper operation of the receiving apparatus.

A telecommunication line, operating over long distances, comprises a number of amplifiers, related to the overall distance to be covered to the fiber's attenuation, to the gain of the amplifiers and to the minimum level acceptable for the signal at the receiving station 4.

In general, the amplifiers 6, of whatever type they may be, provide for the receiving and/or emission of control signals, such as for the activation thereof or the monitoring of the operation of some of the components, and, in addition, are subjected to maintenance activities for which an operator may have to communicate with the terminal transmitting or receiving stations, or with other line amplifiers.

Therefore, in all these cases, it is necessary to introduce into the communication line 3 further signals, which may be received and injected at any line amplifier 6 or at the terminal stations 1 or 4 as indicated by the arrows 7.

In the case wherein the line amplifiers are repeaters, which receive optical signals travelling on the line, convert them into an electrical form, amplify them electronically and retransmit them in an optical form into the subsequent line section, the service signals may be of the same type as the communications signals and recognized by and separated from the same, or they may be introduced into the line, when all the signals are converted in an electrical form in the amplifiers or in the terminal stations, to be used as required.

In optical fiber telecommunication lines, it is, however, convenient to use amplifiers of the optical type, wherein the signals are amplified while remaining in an optical form. Therefore, in such cases, it is not possible to use electronic means for separating the service signals from the communication signals travelling in the same fiber without interrupting the fiber itself.

Figure 2:
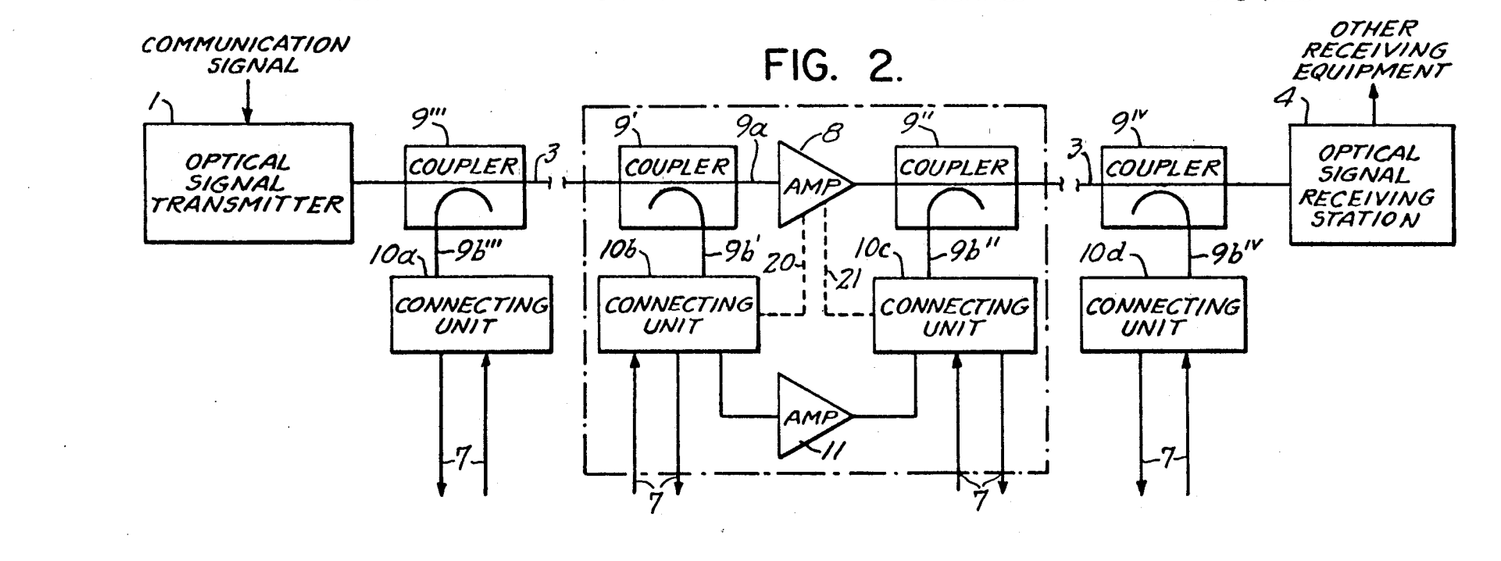
FIG. 2 is a block and schematic diagram of an optical fiber telecommunication line, with line amplifiers which are provided with inputs and outputs for service communications.

For such purpose, according to the invention and as illustrated by FIG. 2, at each optical amplifier 8, forming part of the amplifier 6, there are, upstream and downstream from the same, two dichroic couplers 9' and 9". The dichroic coupler 9' is adapted to receive in a common input the communication signals and the service signals, having wavelengths which are different and which are multiplexed on the same fiber, and for separating at their outputs, on two outgoing fibers 9a and 9b, the communication signals at one wavelength and the service signals at a different wavelength, respectively. The coupler 9' also is adapted to send in a single outgoing fiber the communication signals and the service signals separately injected into fibers 9a and 9b.

Similar dichroic couplers 9''' and $9^{IV}$ are present at the transmitting and receiving stations 1, 4, respectively.

In order to accomplish the separation between the signals by means of dichroic couplers, the wavelength of the service signals is selected to be appreciably different from that of communication signals.

Figure 5:
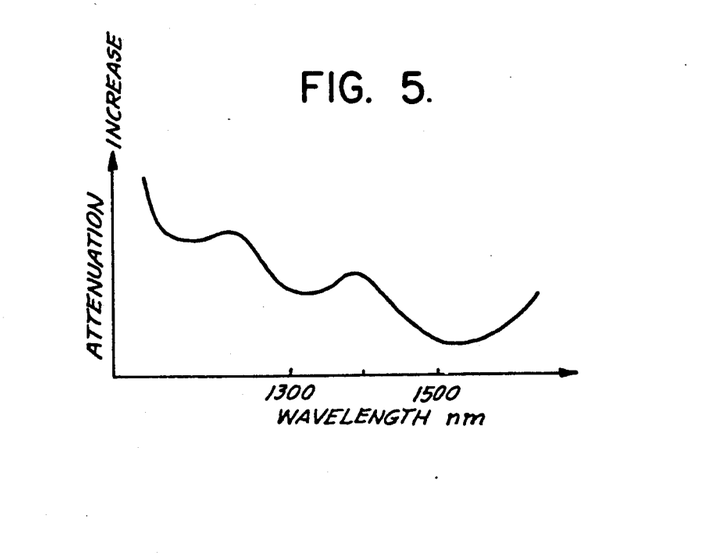
FIG. 5 is a graph showing the light attenuation in a silica optical fiber in relation to the wavelength of the injected light.

The communication signal wavelength usually ranges from 1500 to 1600 nm, in a range called a "third window", so as to operate at the minimum of the light attenuation in silica glass fibers, as illustrated in the diagram of FIG. 5. As required for telecommunications, this allows the transmission of data at high speed, of the order of several hundred Mbit/sec, over distances of tens or hundreds of kilometers before amplification while maintaining the signals at levels sufficient for a correct final reception.

On the other hand, the service signals, in view of their characteristics, can be transmitted at low speed, of the order of some hundreds of Kbit/sec and in particular below 300 Kbit/sec. According to the invention, such service signals are selected to have a wavelength around 1300 nm which is at a secondary minimum of the light attenuation curve in silica glass and is called a "second window".

In the following description, the words "around 1300 nm" shall mean a wavelength in the wavelength range typical of said second window where there is a relatively low attenuation. The width of such range depends on the specific characteristics of the line fiber used. A preferred range, for commonly produced line fibers, is from 1200 to 1400 nm.

The light attenuation at a wavelength in such latter range is appreciably higher than at 1500-1600 nm and would not allow the service signals to travel the distance between two successive amplifiers with a received level acceptable for the receiving equipment suitable for operation at the transmission speeds used for the communication signals indicated hereinbefore, but the service signals, which are transmitted at lower speeds, typically 128 Kbit/sec, can be received by very sensitive receivers. Therefore, a wavelength around 1300 nm is acceptable for the service signals.

Thus, it is possible to use commercially produced dichroic couplers, such as fibers that are fused or using micro-optics, having excellent features in terms of attenuation and reduced cost.

Each dichroic coupler is connected by the corresponding outgoing fiber $9b'-9b^{1V}$ carrying the service signals to respective connecting units $10a-10d$ at which the service signals leaving the coupler are received and converted into corresponding electrical output signals and input electrical signals are converted into optical signals at the service signal wavelength and injected into the fiber $9b'-9b^{1V}$ to be multiplexed along the line.

In this way, an optical signal at 1300 nm, extracted from line 3 by a dichroic coupler is transformed into a corresponding electrical signal which may be used for the purposes for which it is provided, such as, service telephone communications of personnel maintaining or controlling the optical amplifier 8, as represented by the dotted lines 20 and 21 in FIG. 2, or further commands or controls. In a similar manner, electrical control signals or service telephone communications can be sent along fiber 3 of the line to other destinations.

To allow the service signals to reach amplifiers or terminal stations located at a great distance from the place at which the signal originates and along a fiber having several optical amplifiers, the electrical signal, put out by a connecting unit connected to a dichroic coupler and located upstream from an optical line amplifier 8, is electronically amplified, in a known manner, by a corresponding service amplifier 11 and then is sent to the input of a connecting unit connected to a second dichroic coupler downstream from the optical line amplifier 8 which sends the appropriately amplified service signal along the subsequent optical fiber section, either to the destination station or to another optical amplifier.

In this way, the service signal is amplified separately at each optical amplifier of the line and can travel the entire distance required and arrive at destination at a level sufficient for its intended purposes.

Figure 3:
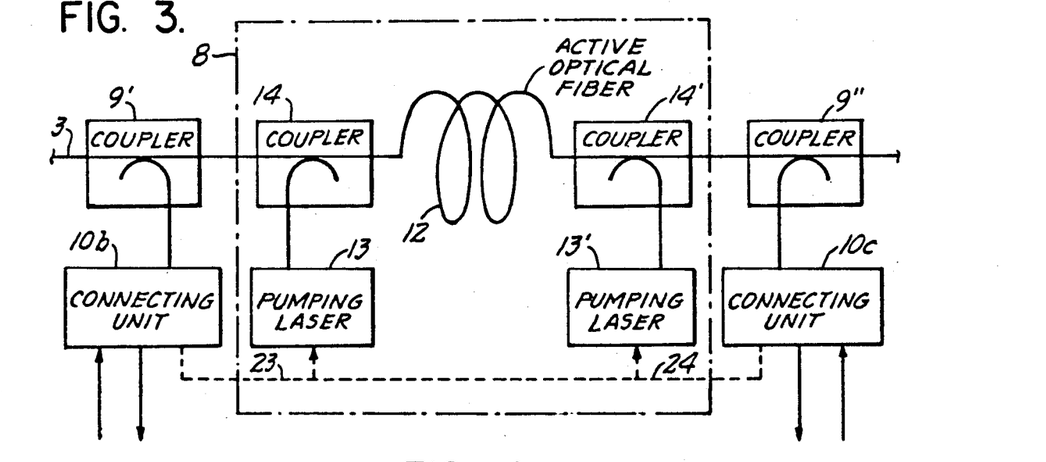
FIG. 3 is a block and schematic diagram of an optical amplifier for a telecommunication line which is provided with inputs and outputs for service channels according to the invention.

FIG. 3 shows in greater detail an embodiment of an optical amplifier 8 which comprises an active optical fiber 12, having a suitable length and doped with a fluorescent substance, a pumping laser 13, connected to a corresponding dichroic coupler 14, which is adapted for sending into the active fiber 12 light energy which produces a stimulated emission inside the fiber itself and which generates the desired amplification.

Preferably, but not necessarily, there can also be a second pumping laser 13' and a corresponding dichroic coupler 14', arranged at the opposite end of the active fiber 12 with respect to coupler 14 and mirror oriented for the purpose of enhancing the pumping power inside the active fiber 12 and/or constituting a pumping means for the active fiber 12 which is held in reserve in case of malfunction of the first pumping laser 13.

In any case, it is to be noted that the possible presence of the second pumping laser 13' and of the coupler 14' is substantially unessential in this embodiment, for the purpose of transmitting the service signals along the optical line according to the present invention.

As already illustrated in FIG. 2, the amplifier 8 is preceded and followed, respectively, by the dichroic couplers 9' and 9", connected to their respective service signal reception and transmission units 10a and 10c. The lasers 13 and 13' are connected, as indicated by the dotted lines 23 and 24, to units 10b and 10c and can, therefore, receive or send control or similar signals which govern their operation.

Figure 4:
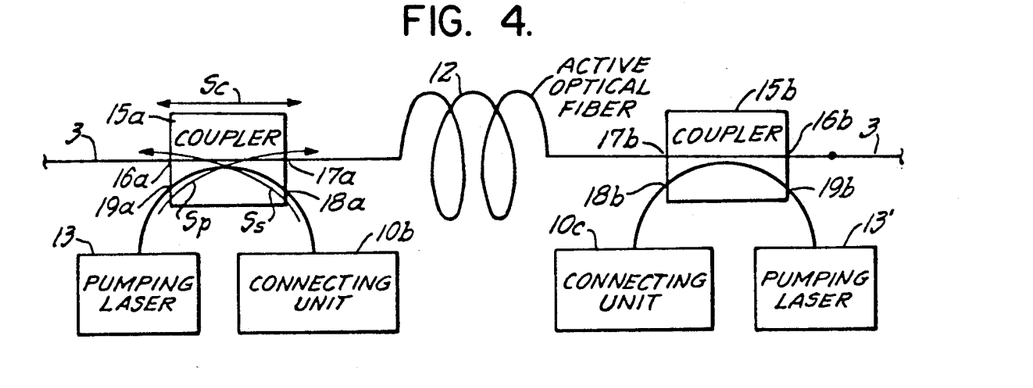
FIG. 4 is a block and schematic diagram of a further embodiment of an optical amplifier for a telecommunication line which is provided with inputs and outputs for service channels according to the invention.

FIG. 4 shows a further embodiment of the invention, in which there are two pumping lasers 13 and 13' each of which, together with a connecting unit 10a and 10b, is connected to a single three-wavelength optical coupler 15a and 15b, so that the pumping laser sends the light energy into the active fiber 12, while the connecting unit 10a or 10b receives service signals, separate from the optical fiber 3 of the line, before they reach the active fiber 12 and/or injects service signals into fiber 3 downstream of the active fiber 12.

As schematically indicated in FIG. 4 by the arrows designated with Sc, Ss and Sp, each dichroic coupler 15a or 15b permits the communication signal Sc, at the communications wavelength (1500-1600 nm) and carried by line fiber 3 to the coupler's input connection 16a to be transferred unaltered at the output connection 17a to which the amplifier's active fiber 12 is connected. The service signals Ss, at the service wavelength (1300 nm), present at input connection 16a is sent to the coupler's output connection 18a to which unit 10b is connected. Vice versa, a signal emitted by unit 10b, as an input to connection 18a is sent, along the same optical path, as an output to connection 16a. The pumping signal Sp, at the pumping wavelength, is sent by pumping laser 13 or 13' as an input to connection 19a or 19b and is sent as an output to connection 17a or 17b.

Three-wavelength optical couplers having the described characteristics and constituted by a single monolithic element, e.g., of the fused fiber type, are known and their provision is made easy and sufficiently inexpensive when the wavelengths to be coupled are appreciably separated one from the other, e.g., when a combination of a communication signal wavelength around 1550 nm and a service signal wavelength around 1300 nm is used, as described above and, in the case of an active fiber doped with Erbium, a pumping wavelength of 980 or 530 nm.

Such an arrangement offers the considerable advantage of accomplishing, with the same component, both the sending of the pumping energy in the amplification fiber, and the extraction or the sending of the service signals in the line fiber, thereby simplifying the amplifier structure and especially reducing the number of junctions between fibers and couplers, each of which is the cause of attenuation for the transmitted signal.

In case the use of the second pumping laser 13' is not desired, in place of the three-wavelength coupler 15b to which such laser would have been connected, it is possible to use a dichroic coupler 9'', as described previously, merely for the connection of the service reception and transmission unit 10c.

Although the injection into and the extraction from the optical line of the service signals is conveniently executed at the line's end stations and at the line amplifiers, as described previously, it is possible to introduce dichroic couplers and service signal reception and transmission stations at any other position of the optical fiber line where there may be a need therefor.

In the case of particular requirements of the line or in the structure of the couplers, a wavelength may be adopted for the service signals other than that around 1300 nm indicated previously, accepting the signal attenuation level which corresponds to the selected wavelength.

In addition, within the scope of the present invention, in the presence of fibers having particular transmission characteristics, instead of the wavelength around 1300 nm, in the sense previously defined, a different wavelength, or a different range of wavelengths, may be adopted for the service signals, corresponding to the related attenuation minimum, or in any case to a sufficiently low attenuation value, in relation to the power and to the sensitivity of the transmission and reception equipment, as long as it is sufficiently far from the range of transmission signal wavelengths as to allow the making of the corresponding optical couplers.

For the purpose of the present invention, it is intended that the line end stations 1 and 4 are two points of the line itself between which the signals travel solely in an optical form and which are amplified where necessary by optical amplifiers of the type described hereinbefore.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber transmission system for the transmission of communication and service signals, said system comprising;
    an optical communication signal transmitter for transmitting optical communication signals of a first predetermined wavelength;
    an optical communication signal receiver for receiving optical communication signals at said predetermined wavelength;
    at least one optical amplifier having an input for receiving said optical communication signals and an output at which optical communication signals corresponding to said optical communication signals received at said input but in amplified form are provided;
    an optical coupling means having an input, an input/output and an output and having its output coupled to the input of said optical amplifier;
    a first section of optical fiber line connecting said optical communication signal transmitter to said optical coupler input for providing said optical communication signals to said input of said optical amplifier;
    means including a second section of optical fiber line connecting said optical amplifier output with said communication signal receiver for providing optical communication signals at said output of said optical amplifier to said communication signal receiver; and
    a connecting unit connected to said optical coupler input/output, said connecting unit comprising at least one of an optical service signal receiver for receiving optical service signals from said optical coupling means at a second predetermined wavelength different from said first predetermined wavelength and of an optical service signal emitter for supplying optical service signals at said second wavelength to said optical coupler, said optical service signal receiver having converting means for converting optical service signals to electrical signals and said optical service signal emitter having converting means for converting electrical signals to optical service signals.

2. An optical fiber transmission system as set forth in claim 1 wherein said means connecting said optical amplifier output with said communication signal receiver comprises:
    a further optical coupler with an input, an input/output and an output with its said input connected to said second section of said optical fiber line and its said output connected to said optical communication signal receiver; and
    a further said connecting unit connected to said input/output of said further optical coupler.

3. An optical fiber transmission system as set forth in claim 1 wherein said means connecting said optical amplifier output with said communication receiver comprises further optical amplifiers connected in series between said one optical amplifier and said receiver by further sections of optical fiber line, each of said further optical amplifiers having an input and output, further comprising a further said optical couplers and further said connecting units, each further optical coupler and each further connecting unit being connected to respective optical amplifiers as set forth in claim 1.

4. An optical fiber transmission system as set forth in claim 1 wherein said second wavelength is selected to be substantially equal to a wavelength at which the attenuation in the sections of optical fiber line is less than the attenuation at adjacent wavelengths.

5. An optical fiber transmission system as set forth in claim 1 wherein said first predetermined wavelength is in the range from about 1500 nm to about 1600 nm, said second predetermined wavelength is in the range from about 1200 nm to about 1400 nm and said service signals have a rate substantially less than 300 kilobits per second.

6. An optical fiber transmission system as set forth in claim 1 wherein said optical coupler is a dichroic coupler.

7. An optical fiber transmission system for the transmission of communication and service signals, said system comprising:

an optical communication signal transmitter for transmitting optical communication signals of a first predetermined wavelength;

an optical communication signal receiver for receiving optical communication signals at said predetermined wavelength;

at least one optical amplifier comprising an active fiber doped with a fluorescent substance and having an input and an output and means for injecting pumping energy at a wavelength which is different from said first predetermined wavelength and which causes said fluorescent substance to fluoresce into at least said input of said active fiber;

a first optical coupler having an input, an input/output and an output and having its output coupled to the input of each active fiber;

a first section of optical fiber line connecting said optical communication signal transmitter to said optical coupler input;

means including a second section of optical fiber line and a second optical coupler connecting said output of each active fiber with one of said communication signal receiver and said input of an active fiber of another said optical amplifier;

a connecting unit connected to said optical coupler input/output, said connecting unit comprising at least one of an optical service signal receiver for receiving optical service signals from said first optical coupler at a second predetermined wavelength different from said first predetermined wavelength and of an optical service signal emitter for supplying optical service signals at said second wavelength to said first optical coupler, said optical service signal receiver having converting means for converting optical service signals to electrical signals and said optical service signal emitter having converting means for converting electrical signals to optical service signals; and a further said connecting unit connected to each said second optical coupler.

8. An optical fiber transmission system as set forth in claim 7 wherein the first-mentioned connecting unit comprises said optical service signal receiver, said optical service signal receiver having means for converting optical signals at said second predetermined wavelength into electrical signals, and wherein said further connecting unit comprises said optical service signal emitter, said optical service signal emitter having means for converting electrical signals into optical service signals at said second predetermined wavelength and interconnecting means interconnecting said converting means of said optical service signal receiver to said converting means of said optical service signals emitter for relaying optical service signals at the input of said active fiber to said further optical coupler.

9. An optical fiber transmission system as set forth in claim 8 wherein said interconnecting means includes an electrical signal amplifier.

10. An optical fiber transmission system as set forth in claim 8 further comprising means interconnecting said converting means of said optical service signal receiver to said means for injecting pumping energy into said active fiber for controlling the last-mentioned said means.

11. An optical fiber transmission system as set forth in claim 7 wherein the first-mentioned said optical coupler is a three-wavelength optical coupler having a further input and said means for injecting pumping energy comprises said further input.

12. An optical fiber transmission system as set forth in claim 11 further comprising further means for injecting pumping energy into the output of said active fiber and wherein said further optical coupler is a three-wavelength optical coupler having a first input connected to the output of said active fiber, an input/output connected to said further connecting unit, and a second input and an output, said further means for injecting pumping energy comprising said second input of said further optical coupler.

* * * * *

(12) REEXAMINATION CERTIFICATE (4472nd)
United States Patent
Grasso et al.

(10) Number: US 5,113,459 C1
(45) Certificate Issued: Oct. 23, 2001

(54) OPTICAL FIBER TELECOMMUNICATION LINE WITH SEPARATE, OPTICALLY TRANSMITTED SERVICE CHANNELS

(75) Inventors: Giorgio Grasso, Monza; Mario Tamburello, Vimercate, both of (IT)

(73) Assignee: Pirelli Cavi S.p.A., Milan (IT)

Reexamination Request:
No. 90/005,496, Sep. 14, 1999

Reexamination Certificate for:
Patent No.: 5,113,459
Issued: May 12, 1992
Appl. No.: 07/647,141
Filed: Jan. 29, 1991

Related U.S. Application Data (63) Continuation-in-part of application No. 07/555,941, filed on Jul. 20, 1990, now Pat. No. 5,054,876, which is a continuation-in-part of application No. 07/605,558, filed on Oct. 29, 1990.

(30) Foreign Application Priority Data

Jan. 30, 1990 (IT) .................................. 19186 A/90

(51) Int. Cl.[7] ........................................ G02B 6/28
(52) U.S. Cl. ........................ 385/24; 385/27; 359/173
(58) Field of Search ........................ 385/24, 25, 26, 385/27, 28, 29, 30, 31, 32; 359/173

(56) References Cited

U.S. PATENT DOCUMENTS

| | | | |
|---|---|---|---|
| 4,112,293 | 9/1978 | Kach ................................. | 385/24 X |
| 4,276,656 | * 6/1981 | Petryk, Jr. .......................... | 385/24 X |
| 4,546,476 | 10/1985 | Shaw ................................. | 372/6 |
| 4,680,809 | 7/1987 | Hartkopf et al. .................... | 385/24 X |
| 4,712,075 | 12/1987 | Snitzer ............................... | 330/4.3 |
| 4,781,427 | * 11/1988 | Husbands et al. .................. | 385/24 X |
| 4,863,231 | * 9/1989 | Byron et al. ........................ | 385/24 X |
| 4,878,726 | * 11/1989 | Fatehi ............................... | 385/24 X |
| 4,886,334 | * 12/1989 | Aoki ................................. | 385/24 X |
| 4,899,043 | 2/1990 | Mochizuki et l. .......... | 250/227.11 X |
| 4,911,515 | * 3/1990 | So et al. ............................. | 385/24 X |
| 4,957,339 | * 9/1990 | Fussganger et al. ................ | 385/24 X |
| 5,054,876 | * 10/1991 | Grasso et al. ...................... | 385/24 |
| 5,202,780 | 4/1993 | Fussanger ........................ | 359/125 |
| 5,299,048 | 3/1994 | Suyama ............................ | 359/179 |

FOREIGN PATENT DOCUMENTS

| | | | |
|---|---|---|---|
| A-78368/87 | 9/1987 | (AU) ............................... | 359/115 X |
| 3907497A1 | 9/1990 | (DE) ............................... | 359/115 X |
| 355 877 A1 | 2/1990 | (EP) ............................... | 385/24 X |
| 0414 333 | 8/1990 | (EP) ............................... | 385/24 X |
| 2546012 | 5/1983 | (FR) ............................... | 359/115 X |
| 56-103552 | 8/1981 | (JP) ............................... | 385/24 X |
| 57-83899 | 5/1982 | (JP) ............................... | 385/24 X |
| 59-66238 | 4/1984 | (JP) ............................... | 372/43 X |
| 59-176937 | 10/1984 | (JP) ............................... | 372/43 X |
| 60-84034 | 5/1985 | (JP) ............................... | 372/43 X |
| 2-1631 | 1/1990 | (JP) ............................... | 385/100 X |

OTHER PUBLICATIONS

Goodman, M.S., et al., "Application of Wavelength Division Multiplexing to Communication Network Architectures," *ICC '86 Conference Record*, p. 931, Toronto (1986).

Hill, G.R., "A wavelength routing approach to optical communication networks," *Proc. IEEE Infocom '88*, pp. 354–362 (1988).

Pettitt, M.J., et al., "Crosstalk in Erbium Doped Fibre Amplifiers," *Electronics Letters*, vol. 25, No. 6, pp. 416–417 (Mar. 16, 1989).

(List continued on next page.)

*Primary Examiner*—Brian Healy (57) ABSTRACT

An optical fiber transmission line which includes units for injecting into, and units for extracting, optical service signals from the line's optical fiber. The units include optical service signal emitters and receivers for receiving from the optical line and/or injecting into the optical line service signals in the form of optical signals having a wavelength which is substantially different from the wavelength of the telecommunication signals also transmitted over the optical line, each of the units is associated with an optical coupler which is inserted in the line and which is suitable for coupling it with the line fiber and/or for extracting the optical service signals from the line fiber.

OTHER PUBLICATIONS

Desurvire, E., et al., "Gain Saturation Effects in High–Speed, Multichannel Erbium–Doped Fiber Amplifiers at λ=1.53 μm," *Journal of Lightwave Technology*, vol. 7, No. 12, pp. 2095–2103 (Dec. 1989).

Acampora, A.S., "A multi–hop lightwave network architecture," *IEEE Globecom '87*, pp. 37.5.1–37.5.9 (Jun. 1987).

Acampora, A.S. and Karol, M.J., "An overview of lightwave packet networks," *IEEE Network*, pp. 29–41 (Jan. 1989).

Acampora, A.S., et al., "Multihop lightwave networks: a new approach to achieve terabit capabilities," ICC, paper 46.1, pp. 1478–1484 (1988).

Acampora, A.S., et al., "Terabit Lightwave Networks: The Multihop Approach," *AT& T Technical Journal*, vol. 66, Issue 6, pp. 21–34. (Nov./Dec. 1987).

Alferness, R.C., et al., "Narrowband gain AsP/InP waveguide–folded directional coupler multiplexer/demultiplexer," *Electronics Letters*, vol. 24, pp. 150–151 (1988).

Baack, C. et al., "Coherent Multicarrier Techniques in Future Broadband Communications Networks," ECOC, pp. 79–87 (1987).

Bar–Joseph, I., et al., "Self–electro–optic effect device and modulation convertor with InGaAs/InP multiple quantum wells," *Appl. Phys. Letters*, vol. 52, No. 1, pp. 51–53 (Jan. 4, 1988).

Battini, M., et al., "Operational and Maintenance technology of optical transmission system," ICC, peper 13.1, pp. 0425–0427 (1987).

Bickers, L, et al. "Plans for the Bishops Stortford (UK) fibre to the home trials," ICC, paper 203.1, pp. 22–26 (1990).

Bourne, J., "Heathrow–Experience and Evolution," ICC, paper 203.2, pp. 27–31 (1990).

Brackett, C.A., "Dense wavelength division multiplexing networks: Principles and applications," *IEEE Journal on Selected Areas in Communications*, vol. 8, No. 6, pp. 948–964 (Aug. 1990).

Brackett, C.A., "Dense WDM Networks," Proc. ECOC '88, pp. 533–540 (1988).

Brackett, C.A., "Guest Editorial," *IEEE Communications Magazine*, Special Issue on Lightwave Systems and Components, vol. 27, No. 10, pp. 16–18 (Oct. 1989).

Brackett, C.A., et al., "A scalable multiwavelength multihop optical network: A proposal for research on all–optical networks," *J. Lightwave Technology*, vol. 11, p. 736 (1993).

Carts, Y.A., "Erbium–doped–fiber amplifiers hit the Market," *Laser Focus World*, p. 149 (Jul. 1990).

Chang, I., "Laser Safety," *Professional Safety*, pp. 50–53 (Nov. 1986).

Channin, D.J., "Emitters for Fiberoptic Communications," Laser Focus, vol. 18, No. 11, pp. 105–113 (Nov. 1982).

Cheung, N.K., et al. (eds.), "Dense Wavelength Division Multiplexing Techniques for High Capacity and Multiple Access Communications Systems," *IEEE Journal on Selected Areas in Communications*, vol. 8, No. 6 (Aug. 1990).

Chlamtac, A.G. and Karmi, G., "Purely optical networks for terabit communications," *Proceedings IEEE INFOCOM '89*, Ottawa, Ont., Canada, vol. 3, pp. 887–896 (Apr. 1989).

Cochrane, Peter, et al., "Local–Line Single–Mode Optics— Viable Options for Today and Tomorrow," *IEEE Journal on Selected Areas in Communications*, vol. SAC–4, No. 9 (Dec. 1986).

Cochrane, Peter, "Undersea Fiberoptic Systems will Benefit from New Technology," *Laser Focus, Electro–Optics*, pp. 141–50 (Nov. 1988).

Cohen, M.I., et al., "Lightwave Technology: An Update," *AT&T Technical Journal*, p. 2–3 (Jan./Feb. 1992).

Cooper, J.M., et al., "Nanosecond–Tunable Double–Section DFB Laser For Dynamic Wavelength Addressing Applications," *Electronics Letters*, vol. 24, No. 19 (Sep. 1988).

Dance, B., "Opticlaly pumped 1.54 μm fiber amplifier looks promising," *Laser Focus World*, p. 129 (Feb. 1989).

DeLange, O.E., "Wide–Band Optical communication systems: part II—Frequency Division Multiplexing," *Proceedings of the IEEE*, vol. 58, No. 10, pp. 1683–1690 (Oct. 1970).

Desurvire, E., et al., "High gain erbium doped traveling wave fiber amplifier," *Optics Letters*, vol. 12, pp. 888–890 (Nov. 1987).

Durhuus, T., et al., "All–Optical Wavelength Conversion by Semiconductor Optical Amplifiers," *Journal of Lightwave Technology*, vol. 14, No. 6, pp. 942–954 (Jun. 1996).

Dutta, N.K., et al., "Performance Comparison of InGa AsP Lasers Emitting at 1.3 and 1.55mm for Lightwave Systems Applications," *AT&T Technical Journal*, vol. 64, No. 8, pp. 1857–1858 (Oct. 1985).

Edagawa, N. et al., "First Field Demonstration of Optical Submarine Cable System Using LD–Pumper Er–Doped Optical Fibre Amplifier," *Electronics Letters*, vol. 25, No. 19, pp. 1278–1280 (Sep. 14, 1989).

Eng, K.Y., "A multiplexer ring architecture for distributed lightwave networks," ICC, paper 46.3, pp. 1450–1496 (1988).

Fujiaski, M., et al., "Advanced technologies for high–speed optical repeaters," ICC, paper 48.4, pp. 1543–1548 (1986).

Fujiwara, M. et al., "A Coherent Photonic Wavelength–Division Switching System for Broadband Networks," Journal of Lightwave Technology, vol. 8, No. 3, pp. 416–422 (Mar. 1990).

Gimlett, J.L., et al., "Gbit/s optical transmission experiment using 1540nm DFB laser with non–return–to–zero modulation and pin/HEMT receiver," *Electronics Letters*, vol. 25, No. 9, pp. 596–597 (Apr. 27, 1989).

Glance, B., et al., "Densely spaced WDM coherent optical star network," *Electronics Letters*, vol. 23, pp. 875–876 (1987).

Gloge, D.C. et al., "Terrestrial Intercity Transmission Systems," Optical Fiber Telecommunications II, Chapter 23, pp. 855–878 (1988).

Goddard, I.J., et al., "Multichannel networking and its applications," ICC, paper 1.4, pp. 0016–0020 (1988).

Goodman, M.S., "Multiwavelength networks and new approaches to packet switching," *IEEE Communications Magazine*, pp. 27–35 (Oct. 1989).

Green, P.E. et al., "All–Optical Packet–Switched Metropolitan–Area Network Proposal," *Journal of Lightwave Technology*, vol. 11, No. 5/6, pp. 754–763 (May/Jun. 1993).

Grosskopf, L. et al., "Semiconductor laser optical amplifiers in switching and distribution networks," *Optical and Quantum Electronics*, vol. 21, pp. S59–S74 (1989).

Heismann, F. and Ulrich, R., "Intergated–optical frequency translator with stripe waveguide," *Appl. Phys. Lett.*, vol. 45, p. 490 (1984).

Henry, P.S., "Introduction to Lightwave Transmission," *IEEE Communications Magazine*, vol. 23, No. 5, pp. 12–16 (May 1985).

Hill, A.M. and Payne, D.B., "Linear crosstalk in wavelength–division multiplexed optical–fiber transmission systems," *Journal Lightwave Technology*, vol. LT–3, pp. 643–651 (1985).

Hluchuj, M.G., "Shuffle Net: An Application of Generalized Perfect Shuffles to Multihop Lightwave Networks," *IEEE Infocom '88*, Paper 4B.4, pp. 379–390 (Mar. 1988).

Ikegami, T., "Semiconductor Devices in Photonic Switching," *IEEE Journal on Selected Areas in Communications*, vol. 6, No. 7, pp. 1131–1140 (Aug. 1988).

Inao, S., et al., "Optical Fibre cables and accessories for multi–service distribution system," ICC, paper 25.3, pp. 782–787 (1986).

Inoue, K., "Wavelength Conversion with Self Wavelength Selection using Mach–Zehnder Filter and DFB–LD," *Electronics Letters*, vol. 25, No. 25, pp. 1707–1708 (1989).

Ishio, H., et al. "Review and status of wavelength division multiplexing technology and its application," *Journal of Lightwave Technology*, vol. LT–2, pp. 448–463 (Aug. 1984).

Kaiser, P., J. Midwinter and Shimada, S., "Status and future trends in terrestrial optical fiber systems in North America, Europe, and Japan," *IEEE Communications Mag.*, vol. 25, pp. 8–13 (1987).

Kaminow, I.P., et al., "FDM–FSK Star Network With A Tunable Optical Filter Demultiplexer," *Electronics Letters*, vol. 23, No. 21, pp. 1102–1103 (Aug. 26, 1987).

Kanada, Tetsuya, et al., "Design and Performance of WDM Transmission Systems at 6.3 Mbits/s," *IEEE Trans. on Communications*, vol. COM–31, No. 9, pp. 1095–1102 (Sep. 1983).

Kawaguchi, H., et al., "Optical frequency–selective amplification in a distributed feedback type semiconductor laser amplifier," *Applied Physics Letters*, p. 66 (Jan. 12, 1987).

Kawaguchi, K., et al., "Tunable optical–wavelength conversion using a multielectrode distributed–feedback laser diode with a saturable absorber," *Electronics Letters*, vol. 23, p. 1088–1089 (1987).

Kawaguchi, K., et al., "Tunable optical–wavelength conversion using an optically triggerable multielectrode distributed feedback laser diode," *IEEE J. Quantum Electron*, vol. 24, p. 2153–2159 (1988).

Kazovsky, L.G., "Coherent optical receivers: Performance analysis and laser linewidth requirements," *Optical Engineering*, vol. 25(4), pp. 575–579 (1986).

Kobrinski, H., et al., "Demonstration of high capacity in the LAMBDANET architecture: A multiwavelength optical network," *Electronics Letters*, vol. 23, pp. 824–826 (1987).

Kobrinski, H., et al., "Wavelength Selection with Nanosecond Switching Times Using Distributed–Feedback Laser Amplifiers," *Electronics Letters*, vol. 24, No. 15, pp. 969–971 (1988).

Koren, U., et al., "Wavelength division multiplexing light source with integrated quantum well tunable lasers and optical amplifiers," *Appl. Phys. Lett.*, vol. 54, pp. 2056–2058 (1989).

Lee, K.–C. et al., "A wavelength–convertible optical network," *J. Lightwave Technology*, vol. 11, No. 5/6, pp. 962–970 (1993).

Li, T., "Advances in Optical Fiber Communications: An Historical Perspective," *IEEE Journal on Selected Areas in Communications*, vol. SAC–1, No. 3, pp. 356–371 (1983).

Lieu, S.C., et al., "A broadband optical local network based on multiple wavelengths and multiple RF subcarriers," ICC, paper 5.6, pp. 0162–0170 (1989).

Lin, C., et al., "Wavelength–tunable 16 optical channel transmission experiment at 2 Gbit/s and 600 Mbit/s for broadband subscriber distribution," *Electronics Letters*, vol. 24, pp. 1215–1217 (1988).

MacDonald, R. Ian, "Terminology for Photonic Matrix Switches," *IEEE Journal on Selected Areas in Communications*, vol. 6, No. 7, pp. 1141–1151 (Aug. 1988).

Marshall, I.W., et al., "Optical System with two packaged 1.5 $\mu$m Semiconductor Laser Amplifier Repeaters," *Electronics Letters*, vol. 22, No. 5, pp. 253–255 (Feb. 1986).

Marshall, I.W., et al., "10 GHz Optical Receiver Using a Traveling–Wave Semiconductor Laser Preamplifier," *Electronics Letters*, vol. 23, No. 20, pp. 1052–1053 (Sep. 1987).

Mears, R.J., et al., "Low–noise erbium doped fiber amplifier operating at 1.54 $\mu$m," *Electronics Letters*, vol. 23, No. 19, pp. 1026–1028 (Sep. 1987).

Miki, T., et al., "Viabilities of the wavelength–division–multiplexing transmission system over an optical fiber cable," *IEEE Transactions on Communications*, vol. Com–26, No. 7, pp. 1082–1087 (Jul. 1978).

Magara, J., et al., "Optical transmission network prospects in NTT–development plan and economic perspectives," ICC, paper 44.3, pp. 1529–1533 (1987).

Marra, W.C., et al., "FT Series G Lightwave digital transmission system architecture and upgrade capability," ICC, paper 19B.3, pp. 0650–0654 (1987).

Muoi, T.V., "Detectors and receivers reach for sensitivity and bandwidth," *Laser Focus World*, pp. 135–138 (Aug. 1989).

Nakagawa, K., et al., "Optical amplification in trunk transmission networks," *IEEE LTS*, vol. 3, No. 1, pp. 19–26 (Feb. 1992).

Nakogawa, K. et al., "Optical Amplifiers in Future Optical Communication Systems," *IEEE LCS*, vol. 1, No. 4, pp. 57–66 (Nov. 1990).

Nosu, K., et al. "An optical multiaccess network with optical collision detection and optical frequency addressing," ICC, paper 323.3, pp. 0968–0975 (1990).

O'Mahoney, M.J., et al., "Semiconductor Laser Optical Amplifiers for Use in Future Fiber Systems," *Journal of Lightwave Technology*, vol. 6, No. 4, pp. 531–544 (Apr. 1988).

O'Mahoney, M.J., et al., "A 200–km 7.5 mm optical transmission," *Optical Fiber Comm. Conf. Technical Digest*, p. 90 (Feb. 1986).

O'Mahoney, M.J., et al., "Wideband 1.5 $\mu$m Optical Receiver Using Traveling–Wave Laser Amplifier," *Electronics Letters*, vol. 22, No. 23, pp. 1238–1240 (Sep. 1986).

Oberg, M.G., et al., "313 km Transmission Experiment at 1 Gbit/s Using Optical Amplifiers and a Low Chirp Laser," *Electronics Letters*, vol. 24, No. 1, pp. 38–39 (Nov. 1987).

Oguchi, K. et al., "Optical Design and Performance of Wavelength–Division–Multiplexer Optical Repeater for Fiber–Optic Passive Star Networks Connection," *Journal of Lightwave Technology*, vol. LT–4, No. 6, pp. 665–671 (Jun. 1986).

Olsson, N. A., et al., "400 Mbitls, 372 km coherent transmission experiment using in–line optical amplifiers," *Electronics Letters*, vol. 24, pp. 36–37 (1988).

Olsson, N. A., et al., "68.3 km transmission with 1.37 Tbit–km/s capacity using wavelength division multiplexing often single–frequency lasers at 1.5 $\mu$m," *Electronics Letters*, vol. 21, No. 3, pp. 105–106 (Jan. 1985).

Olsson, N.A., "ASK Heterodyne Receiver Sensitivity Measurements with Two In–Line 1.5,, Optical Amplifiers," *Electronics Letters*, vol. 21, No. 23, pp. 1085–1087 (Sep. 1985).

Olsson, N.A., "Lightwave systems with optical amplifiers," *J. Lightwave Technology*, vol. 7, No. 7, pp. 1071–1082 (Jul. 1989).

Olsson, N.A., et al., "High–Sensitivity Direct–Detection Receiver with a 1.5 mm Optical Preamplifier," *Electronics Letters*, vol. 22, No. 21, pp. 1114–1116 (Aug. 1986).

Olsson, N.A., et al., "Transmission Experiment At 3 Gbit/s With Close–Spaced Wavelength–Division–Multiplexed Single–Frequency Lasers at 1.5 mm," *Electronics Letters*, vol. 20, No. 17, pp. 673–674 (Jul. 1984).

Pan, J.J., "High–performance, wideband fiber optic repeater and its application," First European Conference on Optical Fibre Communication, pp. 141–143 (Sep. 1975).

Parry, G., et al., "Principles of photonic switching," ICC, paper 45.1, pp. 1556–1558 (Jun. 1987).

Paul, D.K., "Fiber optic communications system: Year 2000," ICC, paper 26.2, pp. 813–819 (Jun. 1986).

Pesavento, G.A., "Opto–mechanical switching," *Lightwave*, pp. 24–25 (Jan. 1991).

Grosskopf, et al., "Cascaded INLINE semiconductor Laser Amplifiers in a coherent Optical Fibre Transmission Systems," *Electronics Letters*, vol. 24, No. 9, pp. 551–552 (1988).

Pettitt, M.J., et al., "System Performance of Optical Fibre Preamplifier," *Electronics Letters*, vol. 25, No. 4, pp. 273–275 (Feb. 1989).

Ragdale, C.M., et al., "Integrated Laser and add–drop optical multiplexer for narrowband wavelength division muliplexing," *Electronics Letters*, vol. 28, No. 8, pp. 712–714 (Apr. 1992).

Ramaswami, R. et al., "Routing and wavelength assignment in all–optical networks," *IEEE/ACM Trans. on Networking*, pp. 489–500 (Oct. 1995).

Rogalski, J.E., "Evolution Of Gigabit Lightwave Transmission Systems," *AT&T Technical Journal*, vol. 66, Issue 3, pp. 32–40 (May/Jun. 1987).

Salz, J., "Coherent Lightwave Communications," *AT&T Technical Journal*, vol. 64, No. 10, pp. 2153–2209 (Dec. 1985).

Saul, D.F. et al., "Constructing Telecom Canada's coast–to–coast fibre optic network," ICC, paper 53.1, pp. 1684–1688 (Jun. 1986).

Stauffer, J.R., "FT3C—A Lightwave System for Metropolitan and Intercity Applications," *IEEE Journal of Selected Areas in Communications*, pp. 413–419 (Apr. 1983).

Stern, W. et al., "Three–channel, High Speed Transmission over 8 Km Installed, 1300nm Optimised Single–mode Fibre Using 800nm CD Laser and 1300/1500nm LED Transmitters," *Electronics Letters*, vol. 24, No. 3, pp. 176–177 (Feb. 1987).

Stone, J. et al., "Pigtailed high–finesse tunable fiber Fabry–Perot interferometers with large, medium and small free spectral range," *Electronics Letters*, vol. 23, No. 15, pp. 781–783 (Jul. 1987).

Suzuki, S. et al., "Optical Broadband Communications Network Architecture Utilizing Wavelength–Division Switching Technologies," Topical Meeting on Photonic Switching, Optical Society of America, ThA2–1 to ThA2–3 (Mar. 1987).

Suzuki, S., et al., "A photonic wavelength division switching system using tunable laser diode filters," ICC, paper 23.1, pp. 0722–0727 (Jun. 1989).

Suzuki, S., et al., "Wavelength–division switching technology in photonic switching systems," ICC, paper 328.1, pp. 1125–1129 (1990).

Yasui, T. et al., "Overview of Switching System/Network Architectural Possibilities," Topical Meeting on Photonic Switching, Optical Society of America, WB4, pp. 13–15 (Mar. 1, 1987).

Toba, H., et al., "16–Channel Optical FDM Distribution Transmission Experiment Utilising $Er^3$ Doped Fibre Amplifier," *Electronics Letters*, vol. 25, No. 14, pp. 885–887 (Jul. 6, 1989).

Toba, H., et al., "A 100–channel optical FDM transmission/distribution at 622 Mb/s over 50 km," *J. Lightwave Technology*, vol. 8, No. 9, pp. 1396–1401 (Sep. 1990).

Vecchi, M.P., et al., "High–bit rate measurements in the LAMBDANET multiwavelength optical star network," *Tech. Dig. Optic. Fiber Conf.*, WO2 (1988).

Veyres, C., et al., "Fibre to the home: Biarritz (1984) . . . Twelve Cities (1988)," ICC, peper 28.1, pp. 0874–0878 (1988).

Wagner, R.E., et al., "Coherent Lightwave Systems for Interoffice and Loop–Feeder Applications," *Journal of Lightwave Technology*, vol. LT–5, No. 4, pp. 429–438 (Apr. 1987).

Wagner, Stuart S., "Optical Amplifier Applications in Fiber Optic Local Networks," *IEEE Transactions on Communications*, vol. COM–35, No. 4, pp. 419–426 (Apr. 1987).

Welter, R., et al., "Performance of EDFA in 16–channel coherent broadcast network," *Electronics Letters*, vol. 25, No. 20, pp. 1333–1335 (Sep. 1989).

Welter, R., et al., "Sixteen–channel coherent broadcast network at 155 Mbit/s," *Journal of Lightwave Technology*, vol. 7, No. 10. pp. 1438–1444 (Oct. 1989).

Westlake, H.J., "Subcarrier Multiplexed Transmission Using Wavelength Division Multiplexing and Optical Amplifier," *Electronics Letters*, vol. 25, No. 10, pp. 632–634 (May 1989).

Westlake, H.J., et al., "Reconfigurable wavelength routed optical networks: A field demonstration," *Conf. Record. Eur. Conf. on Optical Communications*, WePS2–21, pp. 753–756 (Sep. 1991).

Wyatt, R. et al., "10 kHz linewidth 1.5 $\mu$m InGaAsP external Cavity Laser with 55 nm tuning range," *Electronics Letters*, vol. 19, No. 3, pp. 110–112 (Feb. 1983).

Yamamoto, Y., "Noise and Error Rate Performance of Semiconductor Laser Amplifiers in PCMIM Optical Transmission Systems," *IEEE Journal of Quantum Electronics*, vol. QE–16, No. 10, pp. 1073–1081 (Oct. 1980).

Niiro, Y., "The OS–280M Optical–Fibre Submarine Cable System," *IEEE Journal on Selected Areas in Communications*, vol. SAC–2, No. 6, pp. 807–811 (Nov. 1984).

Zyskind, J.L., et al., "Erbium–Doper Fiber Amplifiers and the Next Generation of Lightwave Systems," *AT&T Technical Journal*, vol. 71, No. 1, pp. 53–62 (Feb./Jan. 1992).

"OE/FIBERS '89 presents system refinements," *Laser Focus World*, pp. 146–147 (Nov. 1989).

"Japanese exhibit next-generation fiberoptic devices," *Laser Focus World*, pp. 145–146 (Oct. 1989).

"Optical Amplifier-OFC Product Review," *Laser Focus World*, p. 200 (Jan. 1989).

Smith, D.W. et al., "Optical Processing in Future Coherent Networks," *IEEE/IEICE Global Telecommunications Conference 1987*, pp. 18.2.1–18.2.6 (Nov. 15–18 1987).

"Product Showcase," *Lightwave*, p. 35 (Jul. 1990).

Blank et al., "Optical Time Domain Reflectometry on Optical Amplifier Systems," *Journal of Lightwave Technology*, vol. 7, No. 10, pp. 1549–1555 (Oct. 1989).

Cox et al., "First Field Demonstration of In–Service Fault Location/Supervisory Using Optical Time Domain Reflectometry," *Electronics Letters*, vol. 26, No. 2, pp. 110–111 (Jan. 18, 1990).

Delzenne et al., "Supervision of optical CATV trunk networks," *Commutation & Transmission*, No. 3, pp. 7–16 (1989).

Ellis et al, "Supervisory System for Cascaded Semiconductor Laser Amplifier Repeaters," *Electronics Letters*, vol. 25, No. 5, pp. 309–311 (Mar. 2, 1989).

Kaminow, "FSK with Direct Detection in Optical FDM Networks," *Proceedings IEEE Global Telecommunications Conference & Exhibition*, Paper 1.1, pp. 1–9 (Nov. 1989).

Miniscalco et al., "Fiber Optic Lasers and Amplifiers for the Near-Infrared," *Materials Science Forum*, vols. 32–33, pp. 501–510 (1988).

Scholz, "Verfahren für schmalbandige Rückkanäle in Breitbandverteilnetzen," ANT Nachrichlentechnik (1984). [with Statement of Relevance].

Senior, "Optical Fiber Communication—Principles and Practice," Prentice/Hall International. Inc., London, pp. 386–387 (1985).

Settembre et al., "Gain Compression in Fiber Amplifier in the Presence of ESA," *ECOC '89*TuP–15, pp. 502–505 (1989).

Wagner, "Optical Amplifier Applications in Fiber Optic Local Networks," *IEEE Transactions on Communications*, vol. COM–35, No. 4, pp. 419–426 (Apr. 4, 1987).

Wagner et al., "WDM Applications in Broadband Telecommunication Networks," *IEEE Communication Magazine*, pp. 22–29 (Mar. 1989).

Winzer, "Wavelength Multiplexing Components—A Review of Single–Mode Devices and Their Applications," *Journal of Lightwave Technology*, vol. LT–2, No. 4, pp. 69–378 (Aug. 1984).

"Breibandverteilnetze der Deutschen Bundespost," 2., überarbeitete und erweiterte Auflage, herausgegeben von Dipl.–Ing. hans Stekle (1988). [with Statement of Relevance].

Diemeer, et al., "Fused Coupler Switch Using a Thermo–optic Cladding," *Electronics Letters*, vol. 25, No. 8, (Apr. 14,1988).

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

New claims 13–43 and 44 are added and determined to be patentable.

13. An optical fiber transmission system as set forth in claim 1, wherein the service signals at the second predetermined wavelength are multibit communications.

14. An optical fiber transmission system as set forth in claim 13, wherein the service signals have a bit rate lower than a bit rate for the optical communication signals.

15. An optical fiber transmission system as set forth in claim 14, wherein the bit rate of the service signals is less than 300 Kbits/sec.

16. An optical fiber transmission system as set forth in claim 1, wherein the at least one amplifier includes a pump source operative at a pump wavelength, the second predetermined wavelength being different from the pump wavelength.

17. An optical fiber transmission system as set forth in claim 1, wherein the second predtermined wavelength is different from the first predetermined wavelength by at least an amount that the optical coupling means can separate.

18. An optical fiber transmission system as set forth in claim 17, wherein the second predetermined wavelength is substantially different from the first predetermined wavelength, the second predetermined wavelength being in the range from about 1200 nm to about 1400 nm and the first predetermined wavelength being in the range from about 1500 nm to about 1600 nm.

19. An optical fiber transmission system as set forth in claim 7, wherein the service signals at the second predetermined wavelength are multibit communications.

20. An optical fiber transmission system as set forth in claim 19, wherein the service signals have a bit rate lower than a bit rate for the optical communication signals.

21. An optical fiber transmission system as set forth in claim 20, wherein the bit rate of the service signals is less than 300 Kbits/sec.

22. An optical fiber transmission system as set forth in claim 7, wherein the second predetermined wavelength is different from the first predetermined wavelength by at least an amount that the optical coupling means can separate.

23. An optical fiber transmission system as set forth in claim 22, wherein the second predetermined wavelength is substantially different from the first predetermined wavelength, the second predetermined wavelength being in the range from about 1200 nm to about 1400 nm and the first predetermined wavelength being in the range from about 1500 nm to about 1600 nm.

24. An optical fiber transmission system including a telecommunications channel for transmitting optical telecommunications signals and a service channel for transmitting optical service communications signals, said optical fiber transmission system comprising:
   an optical telecommunications signal transmitter that emits the optical telecommunications signals at a first predetermined wavelength;
   an optical telecommunications signal receiver that receives the optical telecommunications signals at said first predetermined wavelength;
   an optical amplifier between said optical telecommunications signal transmitter and said optical telecommunications signal receiver, having an amplifier input that receives the optical telecommunications signals, and an amplifier output that produces the optical telecommunications signals in an amplified form;
   a first section of optical fiber line connecting said amplifier output to said optical telecommunications signal receiver;
   an optical coupler, associated with said optical amplifier and being disposed between the optical telecommunications signal transmitter and the optical amplifier, including
      an optical telecommunications signal input connected to said optical telecommunications signal transmitter by a second section of optical fiber line;
      an optical service communications signal input/output; and
      an output coupled to the amplifier input; and
   a connecting unit, connected to said optical service comunications signal input, and including at least one of an optical service communications signal receiver that receives optical service communications signals from said optical coupler at a second predetermined wavelength different from said first predetermined wavelength and of an optical service communications signal emitter adapted to supply optical service communications signals to said optical service communications signal input at said second predetermined wavelength, said optical communications service signal receiver including converting means for converting optical service communications signals to electrical service communications signals and said optical service communications signal emitter including converting means for converting said electrical service communications signals to said optical service communications signals.

25. The optical fiber transmission system of claim 24, wherein said service channel comprises a channel used exclusively by the operator of the optical fiber transmission system for non-subscriber communications.

26. The optical fiber transmission system of claim 24, wherein said telecommunications channel has a first predetermined information bandwidth, and said service channel has a second predetermined information bandwidth substantially less than said first predetermined information bandwidth.

27. The optical fiber transmission system of claim 24, wherein said optical telecommunications signals and said optical service communications signals comprise digital signals, said telecommunications channel is characterized by a first predetermined bit rate, and said service channel is characterized by a second predetermined bit rate substantially lower than said first predetermined bit rate.

28. The optical fiber transmission system of claim 24, wherein said optical service communicatons signals comprise command and control communications for equipment included in said optical fiber transmission system.

29. The optical fiber transmission system of claim 28, wherein said equipment includes said optical amplifier.

30. The optical fiber transmission system of claim 24, wherein said optical service communications signals comprise service personnel communications.

31. The optical fiber transmission system of claim 24, wherein said optical service communications signals comprise monitoring communications from equipment at a terminal station.

32. The optical fiber transmission system of claim 24, wherein said optical service communications signals comprise data communications.

33. The optical fiber transmission system of claim 24, wherein said optical service communications signals comprise voice communications.

34. The optical fiber transmission system of claim 24, wherein the optical amplifier includes a pump source operative at a pump wavelength, the second predetermined wavelength being different from the pump wavelength.

35. The optical fiber transmission system of claim 24, further comprising one or more additional optical amplifiers distributed along said optical fiber transmission system between said optical telecommunications signal transmitter and said optical telecommunications signal receiver.

36. The optical fiber transmission system of claim 24, wherein said second section of optical fiber line has a length such that amplification is required to compensate for the attenuation of said optical telecommunications signals in said second section of optical fiber line.

37. An optical fiber transmission system including a telecommunications channel for transmitting optical telecommunications signals and a service channel for transmitting optical service communications signals, said optical fiber transmission system comprising:

an optical telecommunications signal transmitter that emits the optical telecommunications signals at a first predetermined wavelength;

an optical telecomunications signal receiver that receives the optical telecommunications signals at said first predetermined wavelength;

an optical amplifier, between said optical telecommunications signal transmitter and said optical telecommunications signal receiver, having an amplifier input that receives the optical telecommunications signals, and an amplifier output that reproduces the optical telecommunications signals in an amplified form;

a first section of optical fiber line connecting said amplifier output to said optical telecommunications signal receiver;

an optical coupler, associated with said optical amplifier and being disposed between the optical telecommunications signal transmitter and the optical amplifier, including a common input for said optical telecommunications signals and said optical service communications signals, said common input being connected to said optical telecommunications transmitter by a second section of optical fiber line;

an optical telecommunications signal output coupled to said amplifier input; and an optical service communications signal input/output; and an connecting unit, connected to said optical service communications signal output, and including at least one of an optical service communications signal receiver adapted to receive from said optical service communications signal output said optical service communications signals being at a second predetermined wavelength different from said first predetermined wavelength and of an optical service communications emitter adapted to supply optical service comunications signals to said optical service communications signal input at said second predetermined wavelength, said optical service communications signal receiver including converting means for producing electrical service communications signals from said optical service communications signals and said optical service communications emitter having converting means for converting said electrical service communications signals to said optical service communications signals.

38. The optical fiber transmission system of claim 37, wherein the optical amplifier includes a pump source operative at a pump wavelength, the second predetermined wavelength being different from the pump wavelength.

39. The optical fiber transmission system of claim 37, further comprising one or more additional optical amplifiers distributed along said optical fiber transmission system between said optical telecommunications signal transmitter and said optical telecommunications signal receiver.

40. The optical fiber transmission system of claim 37, wherein said second section of optical fiber line has a length such that amplification is required to compensate for the attenuation of said optical telecommunications signals in said second section of optical fiber line.

41. An optical fiber transmission system including a telecommunications channel for transmitting optical telecommunications signals and a service channel for transmitting optical service communications signals, said optical fiber transmission system comprising:

an optical telecommunications signal transmitter that emits the optical telecommunications signals at a first predetermined wavelength;

an optical telecommunications signal receiver that receives the optical telecommunications signals at said first predetermined wavelength;

an optical amplifer, between said optical telecommunications signal transmitter and said optical telecommunications signal receiver, having an amplifier input that receives the optical telecommunications signals, and an amplifier output that reproduces the optical telecommunications signals in an amplified form;

a first section of optical fiber line connecting said amplifier output to said optical telecommunications signal receiver;

an optical coupler, associated with said optical amplifier and being disposed between the optical telecommunications signal transmitter and the optical amplifier, including a common input for said optical telecommunications signals and first optical service communications signals, said common input being connected to said optical telecommunications signal transmitter by a second section of optical fiber line;

an optical service communications signal input/output; and a common output for said optical telecommunications signals and second optical service communications signals, said common output being coupled to said amplifier input; and a connecting unit, connected to said first optical service communications signal output and to said second optical service communications signal input, said connecting unit including an optical service communications signal receiver adapted to receive from said first optical service communications signal output said first optical service communications signals being at a second predetermined wavelength different from said first predetermined wavelength, said receiver including first converting means for producing first electrical service communications signals from said first optical service communications signals; and an optical service communications signal emitter adapted to supply said second optical service communications signals to said optical service communications signal input at said second predetermined wavelength, said emitter including second converting means for converting second electrical service communications signals to said second optical service communications signals.

42. The optical fiber transmission system of claim 41, wherein the optical amplifier includes a pump source operative at a pump wavelength, the second predetermined wavelength being different from the pump wavelength.

43. The optical fiber transmission system of claim 41, further comprising one or more additional optical amplifiers distributed along said optical fiber transmission system between said optical telecommunications signal transmitter and said optical telecommunications signal receiver.

44. The optical fiber transmission system of claim 41, wherein said second section of optical fiber line has a length such that amplification is required to compensate for the attenuation of said optical telecommunications signals in said second section of optical fiber line.

* * * * *